United States Patent Office 3,426,063
Patented Feb. 4, 1969

3,426,063
INHIBITING THERMAL POLYMERIZATION AND THE GROWTH OF POPCORN POLYMER
Harold Joseph Gros, Baton Rouge, La., assignor to Copolymer Rubber and Chemical Corporation, a corporation of Louisiana
No Drawing. Continuation-in-part of application Ser. No. 395,571, Sept. 10, 1964. This application Aug. 12, 1965, Ser. No. 479,059
U.S. Cl. 260—666.5                   24 Claims
Int. Cl. C07c 7/18, 69/52

This application is a continuation-in-part of application Ser. No. 395,571, filed Sept. 10, 1964, for Inhibiting the Growth of Popcorn Polymer, now abandoned.

This invention relates to a process for inhibiting thermal polymerization and/or the growth of popcorn polymer in compositions containing polymerizable ethylenically unsaturated hydrocarbons and/or esters. The invention further relates to a composition of matter including a polymerizable ethylenically unsaturated hydrocarbon and/or ester and a substance which inhibits thermal polymerization and/or the growth of popcorn polymer therein.

Popcorn polymer forms in compositions containing polymerizable ethylenically unsaturated hydrocarbons and/or esters during their manufacture, processing, handling, storage and use. This is undesirable as the popcorn polymer has no commercial value and thereby results in the loss of monomeric material and a lower monomer utilization. The popcorn polymer also is deposited in or on equipment in contact with the monomers and must be removed at frequent intervals. In instances where the popcorn polymer forms in equipment used in continuously processing the monomers, then it must be taken off stream for cleaning and this causes loss of production and further increases costs. Polymer produced by thermal polymerization of the above monomers is similarly undesirable.

A wide variety of substances have been proposed heretofore for inhibiting thermal polymerization or deactivating popcorn seed to thereby prevent the rapid formation of popcorn polymer or polymer resulting from thermal polymerization. Examples of deactivators for popcorn polymer seed include nitrogen dioxide, iodine, iodine monochloride, sulfur and sulfur monochloride. The popcorn polymer seed deactivators are intimately contacted with cleaned equipment used for the processing, storage or handling of the monomers to thereby deactivate and render inactive any popcorn seed remaining in the system, and then the equipment is placed back on stream. This increases the life of the equipment between shut-downs for cleaning as the formation and propagation of new popcorn seed in a given monomer system requires a much longer period of time than the propagation of existing untreated popcorn seed. However, the popcorn polymer deactivators have not been entirely satisfactory as they have many undesirable characteristics. For instance, they are often very difficult to use on a large scale, too dangerous for general use, cannot be used continuously to provide continuous production, or are not compatible with the monomer or polymer prepared therefrom. Examples of thermal polymerization inhibitors include tertiary butyl catechol, which is likewise not entirely satisfactory for reasons such as those noted above for the popcorn polymer seed deactivators. Also, the tertiary butyl catechol will retard or even prevent activated or catalyzed polymerization and must be removed prior to polymerizing the above monomers to produce desirable polymers. The step of removing the tertiary butyl catechol is an added expense.

The numerous disadvantages associated with the use of prior art thermal polymerization inhibitors and popcorn deactivators have been instrumental in causing a large amount of research to be conducted which was designed to discover a satisfactory substance and process for inhibiting thermal polymerization and/or the growth of popcorn polymer continuously without retarding activated or catalyzed polymerization, and thereby greatly reduce the rate of growth of undesirable polymer and allow the preparation of a desired polymer in its presence by catalytic polymerization. If a process employing such a substance were available, even though the popcorn seed is not completely deactivated, the rate of growth could be reduced sufficiently to assure a great increase in the length of time between shutdowns of equipment for cleaning. Also, the amount of polymer produced by thermal polymerization could be reduced substantially and without the need for removing the inhibitor prior to the normal or catalyzed polymerization step. However, an entirely satisfactory process for systems containing vinyl pyridine, or ethylenically unsaturated hydrocarbons and/or esters, and which had all of the above-mentioned advantages, was not available prior to the present invention.

The above is especially true of hydrocarbon monomers which are used in the preparation of synthetic rubber latex by an emulsion polymerization process. In order to be entirely suitable, the inhibitor should be effective in small dosages, easy to use, safe, have no pronounced adverse effect on polymerization, and be compatible with the monomer, latex and polymer. The substance should also be capable of inhibiting undesirable thermal polymerization and the growth of popcorn polymer in the liquid phase of an all-monomer system, in the liquid phase of latex containing free monomer, and in the vapor space above an all-monomer system.

It is an object of the present invention to provide a novel process for inhibiting the growth of popcorn polymer.

It is a further object to provide a novel process for inhibiting thermal polymerization.

It is still a further object to provide a novel process for inhibiting the growth of popcorn polymer in latex containing monomeric material, in the liquid phase of an all-monomer system, and/or in the vapor space thereabove.

It is still a further object to provide a novel composition of matter containing polymerizable ethylenically unsaturated hydrocarbons and/or esters, and a substance which inhibits thermal polymerization and/or the growth of popcorn polymer therein.

Still other objects and advantages of the invention will be apparent to those skilled in the art upon reference to the following detailed description and the examples.

In accordance with one important aspect of the present invention, it has been discovered that thermal polymerization and/or the growth of popcorn polymer in a composition comprising a polymerizable ethylenically unsaturated hydrocarbon and/or ethylenically unsaturated ester may be inhibited by admixing therein an effective amount of at least one n-nitrosoarylhydroxylamine or salt thereof. The resultant novel composition of matter which includes the polymerizable ethylenically unsaturated hydrocarbon and/or ethylenically unsaturated ester and the inhibitor may be stored, handled, used as monomeric material in polymerization processes, and otherwise processed while continuously inhibiting thermal polymerization and/or the growth of popcorn polymer therein.

Thermal polymerization and/or the growth of popcorn polymer may be inhibited in a wide variety of polymerizable ethylenically unsaturated hydrocarbons and esters. Examples of polymerizable ethylenically unsaturated hydrocarbons include olefins in general and especially alpha olefins containing about 2–20 carbon atoms and preferably 2–8 carbon atoms, and aromatic hydrocarbons having one or more side chains with ethylenic unsaturation containing, for example, 2–8 carbon atoms. The conjugated diolefins and preferably those containing 4–6 carbon atoms such as butadiene, isoprene, piperylene and 2,3-dimethyl butadiene are very useful. Examples of ethylenically unsaturated aromatic hydrocarbons include styrene, alpha vinylnaphthalene and p-divinyl benzene. Examples of ethylenically unsaturated esters include the acrylates such as methyl methacrylate and ethylene dimethacrylate, allyl and diallyl maleate, allyl cinnamate, allyl and diallyl oxalate, allyl and diallyl fumarate, allyl crotonate and drying or semi-drying oils such as tung, corn, soybean, linseed, fish, perilla, and dehydrated castor oils. Mixtures of the above ethylenically unsaturated hydrocarbons and/or esters also may be employed. For example, styrene may be admixed in any desired ratio with butadiene, p-divinyl benzene, diallyl maleate, allyl cinnamate, diallyl oxalate, diallyl fumarate, allyl crotonate or drying oils such as tung oil, and thermal polymerization and/or the growth of popcorn polymer inhibited therein in accordance with the invention. It is understood that the above polymerizable ethylenically unsaturated hydrocarbons and/or esters are merely given as examples of such monomers for use in practicing the present invention, and that other suitable ethylenically unsaturated hydrocarbons and/or esters may be used.

The n-nitrosoarylhydroxylamine which may be employed as inhibitors are known compounds, and may have the following general formula:

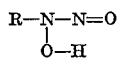

which may be in equilibrium with the tautomeric amine oxide form:

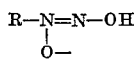

wherein in each instance R is a monovalent aryl radical containing, for example, about 6–20 and preferably about 6–12 carbon atoms. Examples of aryl monovalent radicals, which are usually preferred, include phenyl and naphthyl radicals and their homologues. Examples of specific compounds which are especially preferred are N-nitrosophenylhydroxylamine and N-nitroso-1-naphthylhydroxylamine. Other specific compounds include N-nitroso-p-chlorophenylhydroxylamine or the bromo compound.

Examples of salts of the above N-nitrosoarylhydroxylamines which may be employed include the ammonium, sodium and potassium salts which are usually water soluble, and salts of one or more heavy metals such as iron, copper, titanium, vanadium, molybdenum and tin which may be oil soluble. Chelates of the heavy metals are referred to herein as being salts. Organic amine salts of of the acidic tautomeric form of the N-nitrosoarylhydroxylamine also may be used in some instances, the organic radicals of which each may contain 1–20 and preferably 8–16 carbon atoms. Primary or secondary amines are very useful in forming the amine salts.

Preferably, a salt is employed which is soluble in the composition containing the monomer to be inhibited; however, this is not always necessary for acceptable results. Usually, the ammonium and alkali metal salts are water soluble and thus may be preferred in inhibiting the growth of popcorn polymer in unstripped latex and other aqueous systems containing free monomer. On the other hand, certain amine salts and heavy metal salts such as the iron salt are very soluble in the hydrocarbon monomer and may be preferred in inhibiting the growth of popcorn polymer in all-monomer systems or organic solvent solutions of monomers. The copper salt is only slightly soluble in organic solvents such as hydrocarbon monomers and forms a fine suspension. Amine salts prepared from long chain amines are usually soluble in the monomers.

The ammonium salt of N-nitrosophenylhydroxylamine (cupferron) is very effective in inhibiting thermal polymerization and/or the formation of popcorn polymer and especially in all-monomer systems, latex systems including monomer, and in vapor spaces above each of the systems. Therefore, this substance is unique and is in a class by itself as the presently preferred inhibitor. Another salt which is especially useful is the ammonium salt of N-nitroso-1-naphthyl-hydroxylamine (neocupferron). Examples of heavy metal salts which are very useful in inhibiting thermal polymerization and/or the formation of popcorn polymer in all-monomer systems or organic solvent solutions of the monomer include the long chain amine, iron and copper salts of N-nitrosophenylhydroxyamine and N-nitroso-1-naphthylhydroxylamine. The iron salt of N-nitrosophenylhydroxylamine does not discolor latex appreciably and is especially useful in inhibiting latex or all-monomer systems.

The inhibitor is employed in an amount effective to reduce the rate of formation of undesirable polymer due to unactivated or uncatalyzed polymerization, including the rate of growth of popcorn polymer and/or thermal polymerization, and the quantity may vary over wide ranges. In most instances there is no upper limit except as dictated by economics and the practical aspects. The lower limit may vary somewhat depending upon the specific compound employed and it is understood it is only necessary that the inhibitor be added in a small approximately catalytic amount which is effective to reduce thermal polymerization and/or the rate of growth of popcorn polymer. For example, often 0.001 part to 0.005 part by weight of the inhibitor for each 100 parts by weight of monomer present gives very noticeable improvement. Usually, it is not practical to employ amounts greater than 0.1 part by weight for each 100 parts by weight of monomer, but when desired, larger amounts may be employed such as 0.2 part to 0.5 part by weight or more. About 0.005–0.1 part by weight and preferably about 0.01–0.05 part by weight of the inhibitor for each 100 parts by weight of monomer gives excellent results, but often about 0.01–0.02 part by weight of the inhibitor is the most practical level.

The free N-nitrosoarylhydroxylamines are acidic and tend to be unstable and usually the salts are easier to handle. The selection of a preferred salt will depend upon the nature of the composition to be inhibited. In some instances where the composition contains the free monomer dispersed in an aqueous phase, it is often preferred that a water soluble salt be employed and admixed therewith in the form of an aqueous solution. Usually, ammonium salts are more stable than the alkali metal salts and are preferred for this reason. In instances where an all-monomer system or an organic solvent solution of monomer is to be inhibited, then it is often desirable to add the N-nitrosoarylhydroxylamine in the form of an organic solvent solution of an oil-soluble heavy metal salt such as the copper or iron salt. These salts may be employed in the form of a solution in a portion of the monomer to be inhibited or in other organic solvents.

When inhibiting the growth of popcorn polymer in a latex system which also contains free monomer, a water solution of cupferron may be added in an amount to provide about 0.005–0.1 part by weight and preferably about 0.01–0.02 part by weight of cupferron for each 100 parts by weight of monomer or polymer present. This inhibits the growth of popcorn polymer both within the liquid phase of the latex and in the vapor phase above the latex. In instances where an all-monomer system is to be inhibited, then an organic solvent solution of cupferron or the amine, copper or iron salt of N-nitrosophenylhydroxylamine may be added thereto in the amounts mentioned above for the inhibition of latex. This also results in the inhibition of popcorn polymer growth both in the liquid monomer and in the vapor space above the liquid monomer.

The present invention is especially useful in the production of synthetic rubber by the emulsion polymerization of ethylenically unsaturated hydrocarbons such as conjugated diolefins containing 4–10 carbon atoms and mixtures thereof with aryl olefins such as styrene. Inasmuch as such hydrocarbon monomers may be present in the gaseous phase above the liquid phase of the latex or an all-monomer system, inhibition of thermal polymerization and/or popcorn polymer growth within both the liquid and vapor phases is very important. This is especially true in the commercial production of styrene-butadiene rubber latex or solid polymer where growth of popcorn polymer in the monomer recovery system is pronounced and troublesome. It is possible to add the inhibitor at any desired stage of the over-all process and either before or after the polymerization step as the inhibitor does not have an adverse effect on the polymerization. The inhibitor may be added to the polymerization recipe, with the short stop used for terminating the emulsion polymerization at a desired stage, to the flash tanks which are used to flash off unreacted butadiene monomer, or to the stripping columns which are used to remove unreacted styrene and traces of butadiene from the latex. The inhibitor also may be added to vessels used in storing monomers.

The invention is very useful in inhibiting thermal polymerization and/or popcorn polymer during the manufacture or preparation of the monomers described herein, as well as during their purification, general processing, storage, shipment, handling and use. Thermal polymerization and/or popcorn polymer formation is a problem in the manufacture, storage and shipment of many monomers such as butadiene-1,3. The present invention is especially useful for inhibiting thermal polymerization and/or popcorn polymer in the present commercial processes for preparing and storing butadiene-1,3 and other conjugated diolefins.

The invention is also useful in inhibiting popcorn polymer growth in lubricating oil which contains a small amount of hydrocarbon or other monomers, such as is often true of the ammonia compressor oil in styrene-butadiene rubber plants employing liquified ammonia as a coolant for the reactors. Thus, the invention is not limited to the production of synthetic rubber and may be used in any areas where popcorn polymer is a problem.

The foregoing detailed description and the following specific examples are for purposes of illustration only, and are not intended as being limiting to the spirit or scope of the appended claims.

EXAMPLE I

This example illustrates the use of a variety of inhibitors or mixtures of inhibitors in the liquid phase of an all-monomer system. Each of the inhibitors or inhibitor mixtures was tested as described below.

Thirty grams of liquid styrene monomer was placed in a 7-ounce pop bottle, the bottle was flushed with nitrogen and then 0.5 gram of popcorn polymer seed was added. The inhibitor to be tested was either added to the bottle as the next step or by syringe as an aqueous or styrene solution after the bottle was capped. In instances where the inhibitor was added as a styrene solution, a portion of the 30 grams of styrene to be charged to the pop bottle was used as the solvent so as to provide exactly 30 grams of styrene in the filled bottle.

The bottle containing 30 grams of styrene was thoroughly flushed with nitrogen and capped with a self-sealing cap. One gram of liquid butadiene was then added by syringe through the self-sealing cap. If the inhibitor or inhibitor mixture had not been added previously, it was also added through the self-sealing cap by syringe as an aqueous or styrene solution. The filled bottle containing a total of 31 grams of monomer was then placed in a draft oven maintained at 60° C. and observed for popcorn polymer formation and growth.

The total of 0.02 part by weight of inhibitor or inhibitor mixture charged to the bottle was based upon the 31 gram monomer charge and calculated in part by weight per 100 parts by weight of monomer. The growth of popcorn polymer was measured in the pop bottle in inches after expiration of the stated period of time and recorded.

The efficiency of the inhibitor or mixture of inhibitors was compared by calculating and using an "inhibitor efficiency factor." The effectiveness of an inhibitor is directly proportional to the length of time that it inhibits the growth of popcorn polymer, and inversely proportional to the amount needed to inhibit a given weight of popcorn polymer and to the growth of the popcorn polymer. Since the growth of the popcorn polymer will vary directly with the amount of popcorn polymer seed initially charged, this factor also must be considered. Therefore, combining all of these observations, the following relationship for the inhibitor efficiency factor was derived:

$$\text{Inhibitor efficiency factor} = \frac{\left(\begin{array}{c}\text{time in}\\\text{hours}\end{array}\right) \times \left(\begin{array}{c}\text{initial charge in grams}\\\text{of popcorn polymer seed}\end{array}\right)}{\left(\begin{array}{c}\text{parts by weight in}\\\text{grams of inhibitor}\\\text{or inhibitor mixture}\end{array}\right) \times \left(\begin{array}{c}\text{growth of the}\\\text{popcorn polymer}\\\text{in inches}\end{array}\right)} \times \frac{1}{100}$$

Using the above method of calculation, the larger the inhibitor efficiency factor, the more efficient or effective the inhibitor. The factor $\frac{1}{100}$ is used to give a conveniently small number for the inhibitor factor.

The following data were obtained:

TABLE I.—INHIBITORS IN THE LIQUID PHASE OF AN ALL MONOMER SYSTEM

| Sample Number | Part by Weight of Inhibitor/100 Parts by Weight of Monomer | Time (hours) | Popping (inches) | Inhibitor Factor |
|---|---|---|---|---|
| 1 | None (control) | 68 | 4.25 | |
| 2 | 0.02 Cupferron | 336 | 3.75 | 22.40 |
| 3 | 0.02 N,N-diethyl hydroxylamine | 117 | 3.25 | 9.00 |
| 4 | 0.02 hydroxylamine hydrochloride | 68 | 3.5 | 4.86 |
| 5 | 0.02 N-methyl-N-nitroso-p-toluene sulfonamide | 82 | 4.5 | 4.56 |
| 6 | 0.02 N,N-di-isopropylhydroxylamine hydrochloride | 151 | 3.0 | 12.58 |
| 7 | 0.01 N,N-di-isopropylhydroxylamine hydrochloride plus 0.01 N-methyl-N-nitroso-p-toluene sulfonamide | 151 | 4.25 | 8.88 |
| 8 | 0.01 N,N-di-isopropylhydroxylamine hydrochloride plus 0.01 N-nitrosodiphenyl amine | 151 | 4.5 | 8.39 |
| 9 | 0.01 N-nitroso diphenyl hydroxylamine plus 0.01 N,N-diethylhydroxylamine | 68 | 4.5 | 4.00 |
| 10 | 0.01 N-nitroso diphenyl hydroxylamine plus 0.01 hydroxylamine hydrochloride | 68 | 2.50 | 6.80 |
| 11 | 0.01 N-nitroso diphenyl hydroxylamine plus 0.01 N,N,N',N'-tetramethyl-p-phenylenediamine hydrochloride | 68 | 4.50 | 3.78 |

It may be seen from the above data that cupferron is several times as effective as an inhibitor than other N-nitroso compounds, hydroxylamine compounds and mixtures thereof.

EXAMPLE II

This example illustrates the use of cupferron as an inhibitor over a range of 0.02–0.08 part by weight for each 100 parts by weight of styrene and butadiene monomer. The general procedure followed was the same as that of Example I. The cupferron was added to the pop bottles as a 1% by weight solution in water.

The data thus obtained are recorded below in Table II.

TABLE II

| Sample | Part by Weight of Cupferron/ 100 Parts by Weight of Monomer | Popping (inches) | | | | | | Inhibitor Factor |
|---|---|---|---|---|---|---|---|---|
| | | 82 hrs. | 250 hrs. | 750 hrs. | 924 hrs. | 1,070 hrs. | 1,220 hrs. | |
| Control | None | | | (5″ in 10-20 hrs.) | | | | |
| 1 | 0.02 | 0 | 0 | 4¼ | | | | 44.20 |
| 2 | 0.04 | 0 | 0 | (¹) | 2 | 3½ | 3½ | 51.50 |
| 3 | 0.06 | 0 | 0 | 0 | 0 | 0 | 1¼ | 81.30 |
| 4 | 0.08 | 0 | 0 | 0 | 0 | 0 | 0 | Limit→∞ |

¹ Swollen.

The above data show that cupferron is extremely effective in inhibiting the growth of popcorn polymer.

EXAMPLE III

This example illustrates the use of cupferron as an inhibitor in the vapor space of an all-monomer system. The general procedure of Example I was followed except as noted below.

The popcorn polymer seed was suspended in wire baskets in the vapor space above the liquid monomer level. The amount of inhibitor charged was based upon the 31 grams of monomer charged and the bottles were placed in a 60° C. draft oven to observe the growth of popcorn polymer.

The growth of popcorn polymer was measured by removing it from the bottles at the end of the observation period and weighing it after drying in the draft oven. The percent by weight increase in popcorn polymer was determined as follows:

$$\text{Percent weight increase} = \frac{\begin{pmatrix} \text{Weigh in grams of} \\ \text{popcorn polymer at} \\ \text{end of observation} \\ \text{period} \end{pmatrix} - \begin{pmatrix} \text{Weight in grams of} \\ \text{of popcorn polymer} \\ \text{charged to bottles} \end{pmatrix}}{\text{Weight in grams of popcorn polymer charged to bottles}} \times \frac{100}{1}$$

The inhibitor efficiency factor was calculated as follows:

$$\text{Inhibitor efficiency factor} = \frac{\begin{pmatrix}\text{Time in}\\ \text{hours}\end{pmatrix} \times \begin{pmatrix}\text{Initial charge of pop-}\\ \text{corn polymer in grams}\end{pmatrix}}{\begin{pmatrix}\text{Parts by weight of}\\ \text{inhibitor in grams}\end{pmatrix} \times \begin{pmatrix}\text{Grams of popcorn poly-}\\ \text{mer in the vapor space}\end{pmatrix}} \times \frac{1}{100}$$

The following data were obtained:

TABLE III.—INHIBITORS IN THE VAPOR SPACE OF AN ALL-MONOMER SYSTEM

| Sample Number | Part by Weight of Inhibitor/100 Parts by Weight of Monomer | Time (hours) | Percent Weight of Popcorn Polymer Increase | Inhibitor Factor |
|---|---|---|---|---|
| 1 | None (control) | 312 | 5,400 | |
| 2 | 0.01 Cupferron | 312 | 4,428 | 7.05 |
| 3 | 0.02 Cupferron | 312 | 3,242 | 4.81 |
| 4 | 0.08 Cupferron | 312 | 0 | Limit→∞ |

The above data show that cupferron present in the liquid phase of styrene monomer is very effective in also inhibiting the growth of popcorn polymer in the vapor phase above the liquid monomer.

EXAMPLE IV

This example illustrates the use of inhibitors or inhibitor mixtures in a latex-monomer system.

The popcorn polymer seed employed herein was soaked for at least one hour in concentrated ammonium hydroxide and then rinsed in water. This step was necessary because it was found that upon storage and exposure to air, the popcorn polymer seed took on an acid character. This caused prefloc to form around the particles of seed when immersed in the latex and prevented efficient popping.

The popcorn polymer seed was charged to pop bottles in an amount of about 0.5 gram and about 130 grams of styrene-butadiene rubber latex containing 20 grams of monomeric styrene was added. The latex contained about 17.4% by weight of total solids. The inhibitor compound or mixture to be tested was either added to the open bottles at this stage, or by syringe as a water solution after the bottles were capped.

The pop bottles were flushed thoroughly with nitrogen and capped with a self-sealing cap and two grams of butadiene was added by syringe. If the inhibitor compound had not been charged previously, it also was added by syringe. The bottles were placed in a polymerizer maintained at 50° C. and allowed to agitate. The part by weight of inhibitor or inhibitor mixture charged was based upon 100 parts by weight of the rubber polymer in the latex.

The popcorn polymer was allowed to grow for the indicated period of time and then the amount of growth was measured by screening the latex and weighing the popcorn polymer after drying in a draft oven at 60° C. The percent increase in weight was determined as in Example III and then recorded. Also, the inhibitor efficiency factor was calculated as in Example III and recorded.

The following data were obtained:

TABLE IV.—INHIBITORS IN THE LIQUID PHASE OF A LATEX-MONOMER SYSTEM

| Sample Number | Part by Weight of Inhibitor/100 Parts by Weight of Polymer | Time (hours) | Percent Weight Increase | Inhibitor Factor |
|---|---|---|---|---|
| 1 | None (control) | 106 | 4,244 | |
| 2 | 0.02 cupferron | 58 | 50 | 58.00 |
| 3 | 0.02 N,N-diethyl hydroxylamine | 106 | 3,700 | 1.43 |
| 4 | 0.02 hydroxylamine hydrochloride | 106 | 4,104 | 1.29 |
| 5 | 0.01 N-nitroso diphenylamine plus 0.01 N,N-diethyl hydroxylamine | 106 | 4,040 | 1.31 |
| 6 | 0.01 N-nitroso diphenylamine plus 0.01 hydroxylamine hydrochloride | 106 | 1,600 | 3.31 |
| 7 | 0.01 N-nitroso diphenylamine plus 0.01 N,N,N′,N′-tetramethyl-p-phenylenediamine hydrochloride | 58 | 2,980 | 1.00 |

TABLE IV—Continued

| Sample Number | Part by Weight of Inhibitor/100 Parts by Weight of Polymer | Time (hours) | Percent Weight Increase | Inhibitor Factor |
|---|---|---|---|---|
| 8 | 0.02 N-methyl-N-nitroso-p-toluene sulfonamide. | 106 | 2,950 | 1.80 |
| 9 | 0.02 N,N-diisopropylhydroxylamine hydrochloride. | 106 | 3,000 | 1.77 |
| 10 | 0.01 N,N-diisopropylhydroxylamine hydrochloride plus 0.01 N-methyl-N-nitroso-p-toluene sulfonamide. | 106 | 3,080 | 1.72 |
| 11 | 0.01 N,N-diisopropylhydroxylamine hydrochloride plus 0.01 N-ntrosodipheylamine. | 106 | 3,220 | 1.67 |

The above data show that cupferron in many times as effective in inhibiting the growth of popcorn polymer as other N-nitroso compounds, hydroxylamines and mixtures thereof when employed in a latex-monomer system.

EXAMPLE V

This example compares cupferron and mixtures of N-nitroso and hydroxylamine compounds as inhibitors in a altex-styrene monomer system. The general procedure followed was the same as in Example IV except as noted below.

Popcorn polymer seed was soaked in concentrated $NH_4OH$ for about 1½ hours and then rinsed well with water. Seven-ounce bottles were charged with 150 g. of stripped styrene-butadiene rubber latex containing 17.4% by weight of total solids, 0.5 g. of the treated popcorn seed, and styrene such that a total of 20 milliliters of styrene would be present in each bottle, including the styrene in the solutions. The bottles were flushed with nitrogen and capped with self-sealing caps. Two milliliters of chilled liquid butadiene was added to each bottle by syringe, and then the inhibitor solutions were added to the bottles by syringe. The bottles were then placed in a 50° C. "bottle polymerizer" to have the popcorn polymer "pop." Parts of inhibitor solutions were based on the total solids content of the latex.

The data thus obtained are recorded below in Table V, where "DEHA" refers to N,N-diethylhydroxylamine, "DIHA" refers to N,N-di-isopropylhydroxylamine hydrochloride, and "Diazald" refers to N-methyl-N-nitroso-p-tolenesulfonamide.

TABLE V

| Sample Number | Part by Weight of Inhibitor/100 Parts by Weight of Polymer | Percent by Weight Increase in Popcorn Polymer | Time (hours) |
|---|---|---|---|
| 1 | None | 3,138 | 116 |
| 2 | .02 Cupferron | 84 | 116 |
| 3 | .01 Diazald plus .01 DEHA | 3,156 | 116 |
| 4 | .02 Diazald plus .02 DEHA | 3,104 | 116 |
| 5 | .01 Diazald plus .01 DIHA | 3,106 | 116 |
| 6 | .02 Diazald plus .02 DIHA | 3,100 | 116 |

From the above it can be seen that cupferron is much more effective than the combination of N-nitroso and hydroxylamine compounds.

EXAMPLE VI

This example illustrates the use of small amounts of cupferron as an inhibitor in a latex-monomer system. The procedure followed was the same as in Example IV with the exception of allowing all of the bottles to "pop" for the same length of time.

The following data were obtained:

TABLE IV

| Sample Number | Part by Weight of Inhibitor/100 Parts by Weight of Polymer | Percent Weight Increase |
|---|---|---|
| 1 | None (control) | 3,340 |
| 2 | 0.0025 Cupferron | 3,120 |
| 3 | 0.005 Cupferron | 2,970 |
| 4 | 0.01 Cupferron | 400 |
| 5 | 0.02 Cupferron | 270 |

EXAMPLE VII

This example illustrates the use of the iron and copper chelates of N-nitrosophenylhydroxylamine as inhibitors in an all-monomer system and a latex-monomer system.

The data for the all-monomer system were obtained following the procedure of Example I, and the data for the latex-monomer system were obtained following the procedure of Example IV. The data thus obtained are recorded below in Table VII.

TABLE VII

| Sample Number | Part by Weight of Inhibitor/100 Parts by Weight of Monomer (or Polymer) | All monomer System, Hours to Pop One Inch | Latex-monomer System, Percent Weight Increase |
|---|---|---|---|
| 1 | None (control) | 10 | 2,100 |
| 2 | 0.01 Iron Chelate of N-nitrosophenylhydroxylamine. | 282 | 500 |
| 3 | 0.02 Iron Chelate of N-nitrosophenylhydroxylamine. | 696 | 80 |
| 4 | do | >696 | 40 |
| 5 | 0.08 Iron Chelate of N-nitrosophenylhydroxylamine. | >696 | 0 |
| 6 | 0.01 Copper Chelate of N-nitrosophenylhydroxylamine. | 442 | 0 |
| 7 | 0.02 Copper Chelate of N-nitrosophenylhydroxylamine. | 696 | 0 |
| 8 | 0.04 Copper Chelate of N-nitrosophenylhydroxylamine. | >696 | 0 |
| 9 | 0.08 Copper Chelate of N-nitrosophenylhydroxylamine. | >696 | |

The above data show that the iron and copper chelates of N-nitrosophenylhydroxylamine are highly effective as inhibitors in both all-monomer and latex-monomer systems.

EXAMPLE VIII

This example illustrates the use of neo-cupferron as an inhibitor in an all-monomer system and a latex monomer system.

The data for the all-monomer system were obtained following the procedure of Example I, and the data for the latex-monomer system were obtained following the procedure of Example IV. The data thus obtained are recorded below in Table VIII.

TABLE VIII

| Sample Number | Part by Weight of Neocupferron/100 Parts by Weight of Monomer (or Polymer) | All-monomer System, Hours to Pop One Inch | Latex-monomer System, Percent Weight Increase |
|---|---|---|---|
| 1 | None (control) | <68 | 3,160 |
| 2 | 0.04 Neo-cupferron | 156 | 3,020 |
| 3 | 0.08 Neo-cupferron | 240 | 0 |
| 4 | 0.10 Neo-cupferron | 240 | 0 |

The above data show that neo-cupferron also is highly effective as an inhibitor in both all-monomer and latex-monomer systems.

EXAMPLE IX

This example illustrates the use of amine salts of cupferron as inhibitors in an all-monomer system and a latex-monomer system. The data for the respective systems were obtained following the procedures of Example VIII.

The data thus obtained are recorded below in Table IX.

TABLE IX

| Sample Number | Part by Weight of Inhibitor/100 Parts by Weight of Monomer (or Polymer) | All-monomer System, Hours to Pop One Inch |
|---|---|---|
| 1 | None (control) | 6 |
| 2 | 0.02 Myristylammonium Cupferrate | ~22 |
| 3 | 0.04 Myristylammonium Cupferrate | ~40 |
| 4 | 0.08 Myristylammonium Cupferrate | ~180 |
| 5 | 0.02 N-octylammonium Cupferrate | ~40 |
| 6 | 0.04 N-octylammonium Cupferrate | ~60 |
| 7 | 0.08 N-octylammonium Cupferrate | >200 |
| 8 | 0.02 1,4-dimethylheptylammonium Cupferrate | ~40 |
| 9 | 0.04 1,4-dimethylheptylammonium Cupferrate | ~180 |
| 10 | 0.08 1,4-dimethylheptylammonium Cupferrate | >200 |

EXAMPLE X

This example illustrates the use of cupferron as an inhibitor for popcorn polymer in the liquid and vapor phases of monomeric materials.

The general procedure followed in this example is the same as that of Example I, with the exception of using 0.08 part of cupferron for each 100 parts by weight of the samples of monomeric liquid phase isoprene, butadiene, vinyl naphthalene, propylene, butene-1, butene-2, octene-1, n-octadecene-1, methyl methacrylate, allyl maleate, allyl cinnamate, allyl oxalate, allyl fumarate, tung oil and linseed oil. The data thus obtained show that the cupferron is highly effective in inhibiting the growth of popcorn polymer in both the liquid phase monomers and the vapor spaces above the monomers, as was shown for other monomers in Examples I, II, and III.

EXAMPLE XI

This example illustrates the use of cupferron as a thermal polymerization inhibitor and compares its effectiveness with tertiary butyl catechol.

Polymerization bottles were charged with 100 ml. of fresh caustic washed styrene monomer and flushed with nitrogen. The thermal polymerization inhibitor was added to the bottles in the quantity indicated in Table X.

The bottles were capped with self-sealing caps and placed in an oven maintained at a temperature of 50° C. The heated bottles were observed at frequent intervals, and the induction time for the thermal polymerization was recorded when the first visible thickening of the styrene was noted. The data thus obtained are recorded below in Table X.

TABLE X

| Inhibitor | Concentration of Inhibitor (parts per million) | Induction Time (hours) |
|---|---|---|
| None (control) | | 92 |
| Tertiary Butyl Catechol | 20 | 192 |
| Cupferron | 10 | 200 |
| Cupferron | 50 | 1,272 |

The above data show that cupferron is over twice as effective as a thermal polymerization inhibitor than tertiary butyl catechol. Comparable results are obtained when the various monomers of Example X are substituted for the styrene monomer of this example.

EXAMPLE XII

This example illustrates the fact that the inhibitors of the present invention do not have any substantial effect on the rate of the copolymerization of styrene and butadiene by a prior art "cold rubber" polymerization process.

The styrene-butadiene rubber polymerization recipe used in this example is of the typical "cold rubber" type, as follows:

| Ingredient: | Parts by weight based on the total weight of styrene and butadiene |
|---|---|
| Water | 200 |
| Butadiene | 70 |
| Styrene | 30 |
| Potassium soap of disproportionated rosin | 4.5 |
| Anhydrous trisodium phosphate | 0.3 |
| Sodium salt of alkyl naphthalene sulfonicacid | 0.1 |
| Sodium formaldehyde sulfoxylate .2H$_2$O | 0.05 |
| Ferrous sulfate.7H$_2$O | 0.02 |
| Sodium salt of ethylenediamine tetraacetic acid | 0.03 |
| p-Menthane hydroperoxide | 0.05 |
| Tert-dodecyl mercaptan | 0.20 |
| Sodium hydrosulfite | 0.02 |

The above ingredients were charged into a series of laboratory scale polymerization bottles following the usual prior art practice. One of the bottles was used as a control, and various inhibitors were added to the remaining bottles to test their effect on the polymerization rate.

The bottles after charging and capping were maintained at a temperature of about 41° F. and the styrene and butadiene were allowed to polymerize over a reaction time of 5½ hours. The reaction was terminated by addition of 0.15 part of a short stop composed of a 50–50 mixture of sodium polysulfide and sodium dimethyldithiocarbamate. The unreacted monomer was recovered by flashing and steam distillation, and the percent conversion to polymer and the percent total solids content of the latex per hour to conversion were determined and calculated following the usual prior art practice.

The data thus obtained are recorded below in Table XI.

TABLE XI

| No. | Parts per million of Inhibitor | Reaction Time (hrs.) | Percent Conversion to Polymer | Percent Total Hour to Solids/ Conversion |
|---|---|---|---|---|
| 1 | None (control) | 5½ | 59.8 | 4.16 |
| 2 | 200 Cupferron | 5½ | 60.8 | 4.23 |
| 3 | 500 Cupferron | 5½ | 60.5 | 4.22 |
| 4 | 500 Myristylammonium Cupferrate | 5½ | 60 | 4.18 |
| 5 | 200 1,4-dimethyl-heptylammonium Cupferrate | 6 | 62.5 | 4.00 |
| 6 | 500 Ferric Cupferrate | 5½ | 61.6 | 4.29 |
| 7 | 200 1-nitroso-2-Naphthol | 5½ | Nil | (¹) |
| 8 | 500 1-nitroso-2-Naphthol | 5½ | Nil | (¹) |
| 9 | 1,000 1-nitroso-2-Naphthol | 5½ | Nil | (¹) |
| 10 | 200 Tert-butyl catechol | 5½ | Nil | (¹) |
| 11 | 500 Tert-butyl catechol | 5½ | Nil | (¹) |
| 12 | 1,000 Tert-butyl catechol | 5½ | Nil | (¹) |

¹ No reaction.

The above data show that the inhibitors of the present invention, i.e., cupferron, myristylammonium cupferrate, 1,4-dimethyl heptylammonium cupferrate, and ferric cupferrate do not retard the polymerization rate to any substantial extent. However, tertiary butyl catechol and 1-nitroso-2-naphthol prevent any reaction from occuring. Thus, the inhibitors of the invention may be added to the monomers during storage to inhibit thermal polymerization and/or popcorn polymer formation, and need not be removed prior to use of the monomers in a cold rubber polymerization recipe.

What is claimed is:

1. A process for inhibiting thermal polymerization and the growth of popcorn polymer in a composition including at least one monomer selected from the group consisting of polymerizable ethylenically unsaturated hydrocarbons and polymerizable ethylenically unsaturated esters comprising admixing therein 0.001–0.5 part by weight for each 100 parts by weight of the monomer of at least one substance selected from the group consisting of N-nitrosoarylhydroxylamines and salts thereof.

2. The process of claim 1 wherein the N-nitrosoarylhydroxylamine in N-nitrosophenylhydroxylamine.

3. The process of claim 1 wherein the said N-nitrosoarylhydroxylamine is N-nitroso-1-naphthylhydroxylamine.

4. The process of claim 1 wherein the said substance is selected from the group consisting of the copper and iron salts of N-nitrosophenylhydroxylamine.

5. The composition of claim 1 wherein the said substance is selected from the group consisting of the copper and iron salts of N-nitrosophenylhydroxylamine.

6. A process for inhibiting thermal polymerization and the growth of popcorn polymer in a composition including at least one conjugated diolefin monomer containing 4 through 6 carbon atoms comprising admixing therein 0.001–0.5 part by weight for each 100 parts by weight of the monomer of at least one substance selected from the group consisting of N-nitrosoarylhydroxylamines and salts thereof.

7. The process of claim 6 wherein the N-nitrosoarylhydroxylamine is N-nitrosophenylhydroxylamine and it is added in an amount of about 0.005–0.1 part by weight for each 100 parts by weight of the monomer.

8. The process of claim 6 wherein the substance admixed in the composition is the ammonium salt of N-nitrosophenylhydroxylamine and it is added in an amount of 0.005–0.1 part by weight for each 100 parts by weight of the monomer.

9. The process of claim 8 wherein the monomer comprises butadiene.

10. A process for inhibiting thermal polymerization and the growth of popcorn polymer in a composition including styrene monomer comprising admixing therein 0.001–0.5 part by weight for each 100 parts by weight of the monomer of at least one substance selected from the group consisting of N-nitrosoarylhydroxylamines and salts thereof.

11. The process of claim 10 wherein the N-nitrosoarylhydroxylamine is N-nitrosophenylhydroxylamine and it is added in an amount of about 0.005–0.1 part by weight for each 100 parts by weight of the monomer.

12. The process of claim 10 wherein the substance admixed in the composition is the ammonium salt of N-nitrosophenylhydroxylamine and it is added in an amount of about 0.005–0.1 part by weight for each 100 parts by weight of the monomer.

13. A process for inhibiting thermal polymerization and the growth of popcorn polymer in a composition including monomeric butadiene and styrene comprising admixing the ammonium salt of N-nitrosophenylhydroxylamine therein in an amount effective to inhibit thermal polymerization and the growth of popcorn polymer, the said salt being added in an amount of about 0.01–0.05 part by weight for each 100 parts by weight of the monomeric butadiene and styrene.

14. A composition of matter comprising a mixture of at least one monomer selected from the group consisting of polymerizable ethylenically unsaturated hydrocarbons and polymerizable ethylenically unsaturated esters and an amount effective to inhibit thermal polymerization and the growth of popcorn polymer of at least one substance selected from the group consisting of N-nitrosoarylhydroxylamines and salts thereof, the mixture containing 0.001–0.5 part by weight of the said substance for each 100 parts by weight of the monomer.

15. The composition of claim 14 wherein the N-nitrosoarylhydroxylamine is N-nitrosophenylhydroxylamine.

16. The composition of claim 14 wherein the said N-nitrosoarylhydroxylamine is N-nitroso-1-naphthylhydroxylamine.

17. A composition of matter comprising a mixture of at least one conjugated diolefin monomer containing 4 through 6 carbon atoms and an amount effective to inhibit thermal polymerization and the growth of popcorn polymer of at least one substance selected from the group consisting of N-nitrosoarylhydroxylamines and salts thereof, the mixture containing 0.001–0.5 part by weight of the said substance for each 100 parts by weight of the conjugated diolefin monomer.

18. The composition of claim 17 wherein the N-nitrosoarylhydroxylamine is N-nitrosophenylhydroxylamine and it is present in the composition in an amount of about 0.005–0.1 part by weight for each 100 parts by weight of the conjugated diolefin monomer.

19. The composition of claim 17 wherein the said substance is the ammonium salt of N-nitrosophenylhydroxylamine and it is present in an amount of about 0.005–0.1 part by weight for each 100 parts by weight of the conjugated diolefin monomer.

20. The composition of claim 19 wherein the monomer comprises butadiene.

21. A composition of matter comprising a mixture of styrene monomer and an amount effective to inhibit thermal polymerization and the growth of popcorn polymer of at least one substance selected from the group consisting of N-nitrosoarylhydroxylamines and salts thereof, the mixture containing 0.001–0.5 part by weight of the said substance for each 100 parts by weight of the styrene monomer.

22. The composition of claim 21 wherein the N-nitrosoarylhydroxylamine is N-nitrosophenylhydroxylamine and it is present in the composition in an amount of about 0.005–0.1 part by weight for each 100 parts by weight of the styrene monomer.

23. The composition of claim 19 wherein the said substance is the ammonium salt of N-nitrosophenylhydroxylamine and it is present in an amount of about 0.005–0.1 part by weight for each 100 parts by weight of the styrene monomer.

24. A composition of matter comprising a mixture of monomeric butadiene and styrene and the ammonium salt of N-nitrosophenylhydroxylamine in an amount effective to inhibit thermal polymerization and the growth of popcorn polymer, the said salt being present in an amount of about 0.005–0.1 part by weight for each 100 parts by weight of the monomeric butadiene and styrene.

References Cited

UNITED STATES PATENTS

| | | | |
|---|---|---|---|
| 2,915,507 | 12/1959 | Uraneck | 260—84.1 |
| 3,148,225 | 9/1964 | Albert | 260—669 |
| 3,222,334 | 12/1965 | Demme | 260—84.7 |
| 3,341,487 | 9/1967 | Albert | 260—29.7 |
| 2,730,489 | 1/1956 | Lewis. | |
| 2,965,685 | 12/1960 | Campbell. | |
| 3,265,659 | 8/1966 | Kobayashi. | |
| 3,265,751 | 8/1966 | McCoy. | |
| 3,309,412 | 3/1967 | Sakuragi. | |
| 3,344,144 | 9/1967 | Kobayashi. | |
| 3,371,124 | 2/1968 | Albert. | |

FOREIGN PATENTS 150,550    9/1963    Hungary.

JOSEPH L. SCHOFER, *Primary Examiner.*

J. C. HAIGHT, *Assistant Examiner.*

U.S. Cl. X.R.

260—486, 989